July 5, 1960

A. T. C. BURROWS 2,943,580

CONVEYOR SYSTEMS

Filed July 8, 1957

3 Sheets-Sheet 1

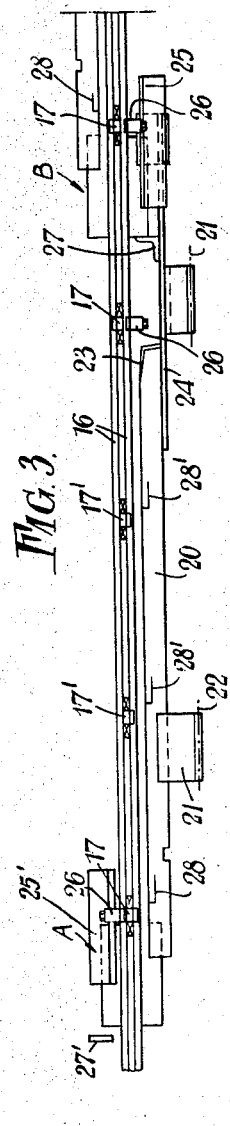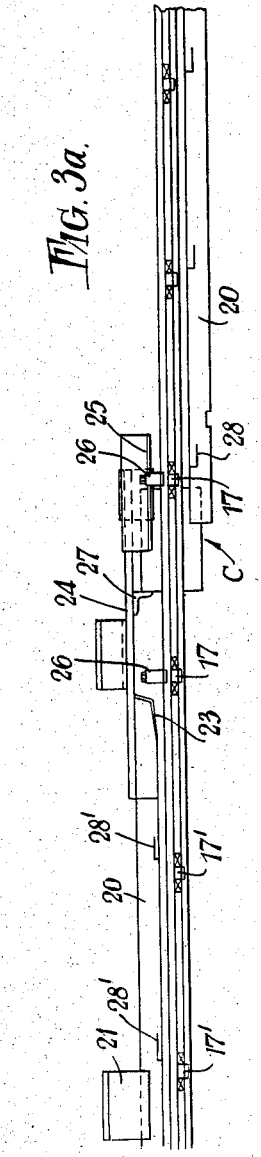

United States Patent Office 2,943,580
Patented July 5, 1960

2,943,580

CONVEYOR SYSTEMS

Arthur Thomas Charles Burrows, Argyle Works, Stevenage, England, assignor to Geo. W. King Limited, Hertfordshire, England, a British company Filed July 8, 1957, Ser. No. 670,503

Claims priority, application Great Britain July 16, 1956

9 Claims. (Cl. 104—162)

This invention relates to conveyor systems and more particulary to systems of the so-called "dual duty" type wherein load carrying trolleys are supported on a fixed track and are propelled along the latter by means of pusher dogs or driving abutments carried by an endless driven chain adapted to move along a path vertically above the aforesaid fixed track.

It is the chief object of the invention to evolve a reciprocating mechanism for incorporation in a conveyor system of the type indicated such mechanism being so designed that when load carrying trolleys are diverted onto a branch or storage line from a so-called "live" line along which they are propelled by the pusher dogs or driving abutments depending from the driven chain, an intermittent or step by step motion along such branch or storage line will be imparted thereto.

According to the present invention in a conveyor wherein load trolleys are supported for free travelling movement on a fixed track, reciprocating drive means are disposed above said track such means including depending pusher dogs or driving abutments which are adapted to cooperate with the trolleys and are effective to impart motion to the latter on movement in one direction only of said reciprocating means so that an intermittent or step by step movement will be imparted to said trolleys. Preferably means will be incorporated whereby a plurality of trolleys may be held in spaced relation at a plurality of stations along the track, said trolleys being fed forwardly by the reciprocating drive means progressively from one station to the next automatically as a trolley is released from such next forward station.

Figure 1:
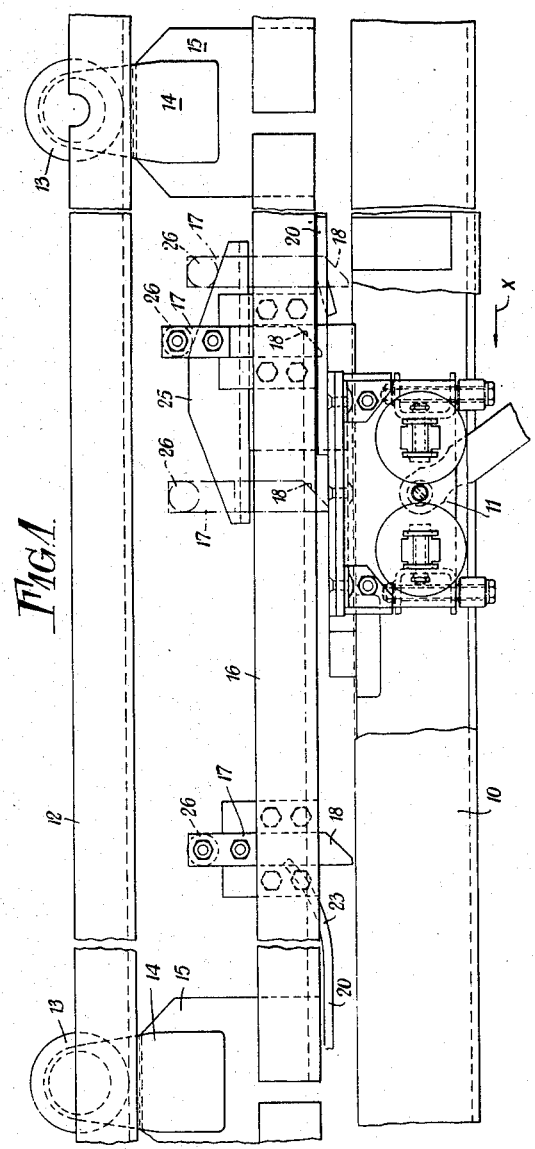
Figure 2:
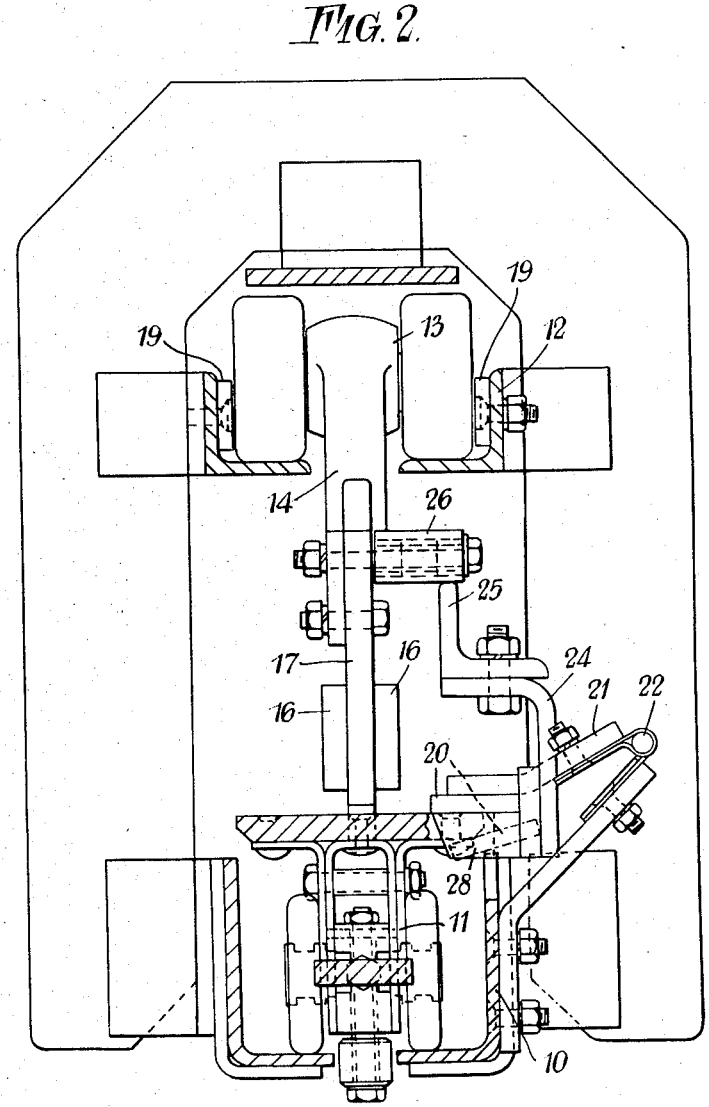

In order that the said invention may be clearly understood and readily carried into effect the same will be hereinafter more fully described with reference to the accompanying drawings in which:

Figure 1 is a side elevational view of a section of a conveyor according to the invention, Figure 2 is a part sectional end elevational view on a larger scale of a conveyor as shown in Figure 1, Figures 3 and 3a together comprise a diagrammatic plan view of a conveyor as shown in Figure 1, In the embodiment of the invention now to be described it will be assumed that in a conveyor system of the so-called dual duty type (i.e. of the type wherein load carrying trolleys are propelled along a fixed track by virtue of the engagement therewith of pusher dogs or abutments carried by an endless driven chain) means are provided whereby load carrying trolleys may be diverted as required from a "live" line to a branch or storage line which may be arranged to communicate with a second "live" line. By "live" line is meant a line or track along which the load carrying trolleys are continuously propelled by virtue of the engagement therewith of the pusher dogs or driving abutments carried by the endless driven chain. In accordance with the present invention means are provided in respect of the branch or storage line whereby an intermittent or step by step movement may be imparted to load trolleys diverted thereto.

Referring now to the drawings, 10 denotes the branch or storage line to which load carrying trolleys, one of which is indicated at 11 are diverted. Disposed vertically above the line 10 is a second or upper track 12 formed by two L section rail members disposed in spaced parallel relation thereby to form a channelled track having a longitudinally extending slot in the base thereof. Running in the upper track is a plurality of trolleys such as are indicated at 13 which are similar to the chain trolleys employed for supporting the driven chain in a normal "dual duty" system. Depending from each trolley 13 through the aforesaid longitudinal slot in the track is a clevis or like attachment 14 adapted to support a depending plate 15 to which rigid coupling bars 16 are attached, such bars serving to connect or couple successive trolleys 13 together so that all of the trolleys present on the track 12 may be reciprocated as a unit. As will be clearly seen from Figures 2, 3 and 3a the coupling bars 16 are arranged in pairs and in spaced parallel relation, each pair being adapted to support a plurality of pusher dogs or driving abutments 17 in such a manner that each dog or abutment will be capable of vertical displacement from an operative position wherein it will engage behind any load carrying trolley 11 present on the track 10 to an upper or inoperative position wherein it will ride over the top of said load carrying trolley. The arrangement is such that the dogs or driving abutments 17 will normally tend to assume their operative positions due to the action of gravity.

The reciprocatory motion above referred to may conveniently be imparted to the unit comprising a plurality of trolleys 13, coupling bars 16 and dogs or abutments 17 from a geared motor (not shown) through the medium of a crank and connecting rod or the like coupled to one of the aforesaid coupling bars 16.

The arrangement is such that on reciprocation of the aforesaid unit the dogs or abutments 17 will be effective in one direction of movement i.e. forward movement indicated by the arrow X (Figure 1) to impart motion to load trolleys 11 present on the branch or storage track 10 but on the reverse or return stroke they will be vertically displaced and will merely ride over the top of any following trolleys which may be present on said track and which will remain stationary until the next forward movement of the reciprocating unit. To provide for the necessary vertical displacement of the dogs or abutments 17 the rear faces thereof are suitably cut away or chamfered as indicated at 18 thereby in each case to provide a cam surface which on contact of the dog or abutment with the top of any load carrying trolley will cause vertical displacement of said dog or abutment.

It may be mentioned here that suitable guide means e.g. wear strips or the like 19 will preferably be incorporated in the upper track 12 to cooperate with the trolleys 13 and to insure true movement thereof back and forth along such track.

In the embodiment illustrated means are incorporated whereby a plurality of holding or storage stations will be provided along the branch or storage track 10 such stations, three of which are indicated at A, B, C (Figures 3 and 3a) being spaced at predetermined distances apart and the arrangement being such that when a load carrying trolley 11 is held at the first or most forward station the next following trolley will be held at the next preceding station and so on. The arrangement is also such that on removal of the load carrying trolley from the first or most forward station the trolley or trolleys at the preceding station or stations will be allowed to move forwardly by one station. The mechanism for accomplishing this indexing or controlled movement of the load carrying trolleys will now be described with reference only to the first or most forward station and the next preceding i.e. the second station, it being understood however that similar mechanisms will be provided between the second and third stations and so on. Located in front of the first station is a displaceable strip 20 such strip extending rearwardly from such station i.e. in the direction of any on-coming trolley. The strip 20 is carried by a bracket 21 which is mounted for hinge movement about an axis 22 parallel to the branch or storage track 10 and it is disposed at one side of said track in such a manner that it will be contacted by any load carrying trolley 11 approaching the first station. The rear end of the strip is suitably curved or upturned as indicated at 23 thereby to provide a cam surface and the arrangement is such that as a trolley 11 approaches the first station it will contact the curved or upturned end of the strip 20 and will cause the same to hinge or swing upwardly. The strip 20 will be held in its uppermost position as the trolley completes its movement towards the first station and it will be held in such position throughout the time said trolley is held at such station. Coupled to the rear end of said strip is a bar 24 which extends rearwardly as far as the second holding station and mounted on or formed integrally with said bar is a cam plate 25. Normally the cam plate will be in an inoperative position but on hinge movement of the strip 20 resultant upon a trolley approaching the first station said cam plate 25 will be swung upwardly into an operative position shown in Figures 1 and 2.

Depending upon the pitch of reciprocating movement of the trolleys 13 and the spacing between the various holding stations all or certain of the dogs 17 will be provided with laterally projecting rollers or the like 26 which are freely rotatable. Reverting now to the description of the mechanism at the first and second stations the arrangement is such that when the cam plate 25 at the second station is actuated and is in its operative position as shown in Figures 1 and 2 it will lie in the path of the rollers 26 associated with the dogs or abutments 17 located in the region of said second station and will be effective to lift the latter clear of the next following load trolley 11 hereinafter termed the second trolley, which is present at said second station so that despite continued reciprocating motion of the dogs or abutments no forward movement will be imparted to said second trolley and the latter will therefore be held at said second station until such time as the first station is cleared. When the trolley 11 at the first station is moved from that station it will move out of contact with the strip 20 and the latter will then swing downwardly into its initial position. Downward movement of the strip 20 will result in the cam plate 25 at the second station being swung downwardly into its inoperative position so that the dogs or abutments 17 in the region of the second station will then become effective to move the second trolley 11 from that station. As the second trolley approaches the first station it will actuate the strip 20 thereby to re-set the cam plate 25 at the second station so that the next succeeding or third trolley 11 will be then held at such latter station until such time as the first station is again cleared. As indicated above there will be similar mechanism between the second and third station and between the third and fourth stations and so on the arrangement being such that each load trolley will be held at a station until the next forward station is clear. It may be pointed out here however that in order appropriately to accommodate the various mechanisms the hinged strips 20 and the associated cam plates 25 will as indicated in Figures 3 and 3a be arranged alternately at opposite sides of the branch or storage track 10.

It will be appreciated that it will be necessary to provide a cam plate or other similar device 25' at the first station in order to render the dog or abutment 17 operating in the region of that station, inoperative during the time that a trolley 11 is held there. Such cam plate or equivalent device may be operated manually, mechanically or electrically. It will be appreciated that depending upon the pitch of reciprocation and upon the spacing of the storage or holding stations each of the pusher dogs or abutments 17 may have a laterally directed roller 26 associated therewith to cooperate with a cam plate 25. Alternatively it may as indicated in Figures 3 and 3a be necessary to provide one or more dogs or abutments 17' hereinafter termed intermediate dogs, between successive dogs or abutments 17 having rollers 26 and hereinafter termed main dogs. The intermediate dogs 17' while being capable of vertical displacement to ride over the top of any trolley during the reverse or return stroke would, since they would be disposed in zones intermediate the stations, never cooperate with a cam plate 25.

Preferably suitable stop means will be provided to hold the trolleys at each station i.e. to prevent any tendency to either forward or rearward motion and similarly where the stroke of the reciprocating mechanism is such in relation to the spacing of the stations that two or more forward strokes will be necessary to move a trolley from one station to the next suitable stops will also preferably be provided at points intermediate the stations to prevent any reverse movement of the trolleys during the reverse or return stroke of the reciprocating drive means. In Figures 3 and 3a such front and back stops at the holding stations are indicated at 27 and 28, said stops being mounted on the bars 24 and strips 20 respectively. At the first station, a stop such as is indicated diagrammatically at 27' will be provided, such stop being adapted to be moved into and out of the operative position shown either manually or through the medium of mechanically or electrically operated means of known type. 28' indicates intermediate stops which are mounted on the strip 20.

It will be appreciated that by introducing suitably articulated couplings between the trolleys 13 it would be possible to move the load trolleys 11 around or along a curved track. Similarly the mechanism may well be adapted for moving trolleys along inclined tracks.

I claim:

1. In a conveyor system wherein load carrying trolleys are propelled along a fixed track by virtue of the engagement therewith of depending pusher dogs which are caused to move along a path parallel to said track while being capable of individual upward displacement, the provision at a selected point along the conveyor path of a first holding station comprising means for stopping a selected load carrying trolley at such station, means for causing the pusher dogs rearwardly of said station to be lifted clear of any trolley held thereat and a hinged member adapted to be displaced angularly and to be held in such position of angular displacement by any trolley approaching and held at said station, there being cam means disposed at a second station located at a point along the conveyor path preceding said first station and means interconnecting the hinged member at the first station to the cam means at the second station so that on angular movement of said hinged member resultant upon the arrival of a trolley at said first station the cam means will be moved into an operative position to cause the pusher dogs in the region of the second station to be lifted clear of any trolley.

2. A conveyor system comprising a fixed track along which load carrying trolleys are adapted to run, reciprocatable drive means disposed above said fixed track and incorporating depending pusher dogs which are disposed in spaced relation and are effective during the forward stroke of said drive means to engage and propel load trolleys present on said track, each pusher dog being capable of vertical displacement from an operative position wherein it will engage a trolley to an inoperative position wherein it will ride over the top of the latter, means at a primary holding station along the conveyor path for stopping any selected load carrying trolley, means at said primary station for causing the pusher dogs to be lifted clear of any trolley held thereat, a hinged member, also at said primary station, adapted to be moved angularly by any trolley approaching such station and to be held in such position of angular displacement while the trolley is held at such station, cam means disposed at a second station located at a point along the conveyor path preceding said primary station and means interconnecting the hinged member at said primary station to the cam means at the second station so that on angular movement of said hinged member resultant upon the arrival of a trolley at the primary station the cam means will be moved into an operative position to cause the pusher dogs rearwardly of said second station to be lifted clear of any trolley.

3. In a conveyor system wherein load carrying trolleys are propelled along a fixed track by virtue of the engagement therewith of depending pusher dogs which are caused to move along a path parallel to said track while being capable of individual upward displacement, the provision at a selected point along the conveyor path of a first holding station comprising means for stopping a selected trolley at such station, means for causing the pusher dogs to be lifted clear of any trolley while held at said station and a hinged strip like member disposed parallel to the track in the region of said station and adapted to be displaced angularly as a trolley approaches the latter and to be held in such position of angular displacement while the trolly is held at said station, there being cam means at a second station located at a point along the conveyor path preceding said first station and a bar like member serving to interconnect the cam means with said hinged strip like member so that on angular movement of the latter due to the arrival of a trolley at said first station the cam means will be moved into an operative position to cause the pusher dogs rearwardly of said second station to be lifted clear of any trolley.

4. In a conveyor system incorporating means as claimed in claim 3 the provision on said bar like member of a lateral projection adapted on actuation of said member due to pivoting of the strip like member to move into an operative position wherein it will constitutes a stop for any trolley approaching the second station.

5. In a conveyor system incorporating means as claimed in claim 3 the provision in the strip like member of a laterally directed projection adapted on actuation of said member to constitute a stop which will prevent any tendency to rearward movement of a trolley held at the first station.

6. A conveyor system comprising a fixed track along which load carrying trolleys are adapted to run, reciprocatable drive means disposed above said fixed tracks and incorporating depending pusher dogs which are disposed in spaced relation and are effective during the forward stroke of said drive means to engage and to propel load trolleys present on said track, each pusher dog being capable of vertical displacement from an operative position wherein it will engage a trolley to an inoperative position wherein it will ride over the top of the latter, means at a primary station along the conveyor path for stopping any selected trolley, means at said primary station for causing the puusher dogs to be lifted clear of any trolley held thereat, a strip like member disposed in the path of travel of trolleys approaching the primary station and capable of hinge movement about an axis substantially parallel to the track so that as a trolley approaches said primary station an angular movement will be imparted to said strip like member, cam means disposed at a second station located at a point along the conveyor path preceding said primary station and a rod like member interconnecting said strip like member and said cam means so that angular displacement of the former will result in movement of the latter into an operative position wherein said cam means will be effective to cause the pusher dogs in the region of said second station to be lifted clear of any trolley.

7. A conveyor system as claimed in claim 6 and wherein the bar like member is provided with a laterally directed projection adapted on actuation of said member due to angular displacement of the strip like member to move into an operative position wherein it will constitute a stop for any trolley approaching said second station.

8. A conveyor system as in claim 6 in which the strip like member is provided with a laterally directed projection adapted on actuation of said member to constitute a stop which will present any tendency to rearward movement of a trolley held at said first station.

9. A conveyor system as claimed in claim 6 and further comprising an upper track spaced vertically above the track on which the load carrying trolleys are adapted to run, secondary trolleys supported on said upper track, a depending attachment associated with each secondary trolley and rigid coupling bars serving to interconnect the attachments of successive trolleys thereby to form a reciprocatable unit, said coupling bars serving to support the pusher dogs in spaced relation and in such a manner that they are capable of individual upward displacement.

References Cited in the file of this patent
UNITED STATES PATENTS

| | | |
|---|---|---|
| 2,035,355 | Weise | Mar. 24, 1936 |
| 2,575,396 | Schenk | Nov. 20, 1951 |
| 2,583,968 | Rosseau | Jan. 29, 1952 |
| 2,624,440 | Hornberger | Jan. 6, 1953 |
| 2,645,186 | Davis | July 14, 1953 |
| 2,684,039 | King | July 20, 1954 |